(12) United States Patent
Park et al.

(10) Patent No.: US 8,351,915 B2
(45) Date of Patent: Jan. 8, 2013

(54) METHOD AND SYSTEM FOR STATUS OF APPLICATION STORING BY USING MOBILE COMMUNICATION TERMINAL

(75) Inventors: Youngmin Park, Seongnam-si (KR); Chaeyong Yi, Seoul (KR); Hoojong Kim, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 734 days.

(21) Appl. No.: 11/911,243

(22) PCT Filed: Jun. 15, 2006

(86) PCT No.: PCT/KR2006/002300
§ 371 (c)(1),
(2), (4) Date: Oct. 11, 2007

(87) PCT Pub. No.: WO2006/135207
PCT Pub. Date: Dec. 21, 2006

(65) Prior Publication Data
US 2008/0153469 A1   Jun. 26, 2008

(30) Foreign Application Priority Data
Jun. 17, 2005   (KR) ................... 10-2005-0052599

(51) Int. Cl.
*H04M 3/00* (2006.01)

(52) U.S. Cl. .................. 455/418; 455/414.1; 455/550.1; 715/810; 715/864; 715/847

(58) Field of Classification Search .... 455/414.1–414.3, 455/550.1, 418; 725/810, 831, 864, 847; 715/810, 831, 864, 847
See application file for complete search history.

(56) References Cited

U.S. PATENT DOCUMENTS

| | | | |
|---|---|---|---|
| 6,181,344 B1 * | 1/2001 | Tarpenning et al. | 715/863 |
| 6,549,217 B1 * | 4/2003 | De Greef et al. | 715/745 |
| 7,191,216 B2 * | 3/2007 | Mattila et al. | 709/205 |

(Continued)

FOREIGN PATENT DOCUMENTS

JP   2001-109714   4/2001

(Continued)

OTHER PUBLICATIONS

Qualcomm, MSM6250 Chipset Solution, Jan. 2004.*

(Continued)

*Primary Examiner* — Vladimir Magloire
(74) *Attorney, Agent, or Firm* — Lowe Hauptman Ham & Berner, LLP

(57) ABSTRACT

The present application discloses a method of storing status of an application. According to some embodiments, whether a user of a mobile communication terminal made a selection to store the status of an application in a shortcut is determined. In response to the selection to store the status of the application in the shortcut, a single string value is generated and stored in the shortcut, where the single string value includes an application parameter and application status information of the application at the time of the storage of the single string value. If the single string value is selected by operating the shortcut, the status, at the time of the storage of the single string value, of the application is reinstated, and execution of the application is resumed according to the application parameter and the application status information of the application.

4 Claims, 4 Drawing Sheets

U.S. PATENT DOCUMENTS

| | | | |
|---|---|---|---|
| 7,363,035 B2 * | 4/2008 | Reilly | 455/432.3 |
| 2001/0003816 A1 * | 6/2001 | Kimmo et al. | 707/1 |
| 2002/0115476 A1 | 8/2002 | Padawer et al. | |
| 2003/0093370 A1 * | 5/2003 | Choi | 705/39 |

FOREIGN PATENT DOCUMENTS

| | | |
|---|---|---|
| JP | 2002-009922 | 1/2002 |
| JP | 2004-005143 | 1/2004 |
| JP | 2004-291585 | 10/2004 |
| JP | 2005-020650 | 1/2005 |
| JP | 2005-0033776 | 2/2005 |
| JP | 2005322135 | 11/2005 |

OTHER PUBLICATIONS

Japanese Office Action for 2008-516756 dated Jun. 5, 2012.

* cited by examiner

METHOD AND SYSTEM FOR STATUS OF APPLICATION STORING BY USING MOBILE COMMUNICATION TERMINAL

CROSS REFERENCE TO RELATED APPLICATION

This application is the National Phase application of International Application No. PCT/KR2006/002300, filed Jun. 15, 2006, which designates the United States and was published in English. This application, in its entirety, is incorporated herein by reference.

TECHNICAL FIELD

The present invention relates to a system and a method for storing the status of an application, in which the parameter and status of an application are stored in a shortcut when the application is executed using a mobile communication terminal, and the stored parameter of the application is loaded without passing through the previous step when the same application is executed. More particularly, the present invention relates to a method and a system for storing the status of an application by using a mobile communication terminal, in which the user of a mobile communication terminal having a mode status storage unit executes an application, the processor of the mobile communication terminal generates a single string value corresponding to the setup of a specific status to transmit the string value to the mode status storage unit, and, if the key input unit of the mobile communication terminal requests a specific string value through the processor, the mode status storage unit transmits the string value desired by the user, and thus the status of the application is stored.

BACKGROUND ART

With the rapid development of electronic and communication technology, our lives have changed in many ways. Conventionally, home appliances occupying one part of our lives have manual functions. However, recent home appliances have many automatic functions, and it is possible to operate home appliances from outside the home with the development of home automation.

A mobile communication terminal most widely used in everyday life has mainly provided a voice communication service. However, with both the development of a wireless communication service through a wireless communication network and the advantage of a mobile communication terminal having no limitations in time and place, the mobile communication terminal has provided a text service, a data service, etc., in addition to a voice service, and thus a voice communication service is compensated for. As the mobile communication terminal provides a data service through a wireless communication service in addition to a voice communication service, various types of data applications is being developed in order to more conveniently use the data service.

Further, mobile communication terminals have been developed again in both a software field and a hardware field. That is, an initial mobile communication terminal for only a voice communication service does not have special functions. Nowadays, a mobile communication terminal has functions capable of listening to music, and can take photographs of images by using a digital camera installed therein and store the photographed images. In addition, a mobile communication terminal having a function for receiving and reproducing broadcasting has also been developed.

As well as a mobile communication terminal, development of devices supportable by the mobile communication terminal has been promoted. At the time point at which the degree of utilization of the mobile communication terminal having applied each of the devices is considerably increasing, development of applications associated with each of the devices has been encouraged.

With the development of a mobile communication terminal, applications for enhancing the degree of utilization of the mobile communication terminal have also been remarkably developed. That is, various types of data applications have been developed, including applications for managing photos and moving pictures photographed by the mobile communication terminal, and applications for storing music files in the mobile communication terminal by using a wireless network or a wired cable and playing the music files, as well as applications for utilizing various emoticons in a text service.

However, in a case in which a specific background scene or music is always used when a message is sent to a specific person, the specific background scene or music must be repeatedly designated whenever the message is created. Further, even when the specific background scene or music is stored as a file through a setup value, a mobile communication terminal user must select and load the setup file after executing a predetermined application.

In addition, in the case of a camera-photographing application, it is necessary to use different setup values when, for example, photographing a landscape during the daytime in the open air and when photographing a close-up photo indoors. Further, it is necessary to change the setup values whenever performing photographing in different environments.

DISCLOSURE OF THE INVENTION

Therefore, the present invention has been made in view of the above-mentioned problems, and it is an object of the present invention to provide a method and a system for storing the status of an application by using a mobile communication terminal, in which the user of a mobile communication terminal having a mode status storage unit executes an application, the processor of the mobile communication terminal generates a single string value corresponding to the setup of a specific status to transmit the string value to the mode status storage unit, and, if the key input unit of the mobile communication terminal requests a specific string value through the processor, the mode status storage unit transmits the string value desired by the user, and thus the status of the application is stored.

According to one aspect of the present invention, there is provided a method for executing an application by using a mobile communication terminal and storing both a parameter (application parameter) of the application being executed and a status (application status) of the application, the method comprising the steps of: (a) if a user of the mobile communication terminal selects the application in the mobile communication terminal, determining by the mobile communication terminal if the application needs wireless network access; (b) if the application needs the wireless network access, accessing by the mobile communication terminal an application-providing server, searching for the application from an application database, and downloading the application; (c) if the application does not need the wireless network access, setting and checking the application parameter necessary for the executed application; (d) determining if it is necessary to perform shortcut storage for the application parameter and the application status; (e) if it is necessary to perform the shortcut storage for the application parameter and the application status, generating a single string value corresponding to the application parameter and the application status, and performing the shortcut storage; and (f) if it is not necessary to perform the shortcut storage for the application parameter and the application status, using a service provided by the application and terminating the application.

According to another aspect of the present invention, there is provided a system for executing an application and storing both a parameter (application parameter) of the application and a status (application status) of the application, the system comprising: a mobile communication terminal for executing the application, setting the application parameter, and storing the application status; a mobile communication network for allowing the mobile communication terminal to download the application through a wireless network; an application-providing server for providing a search of the application to the mobile communication terminal through the mobile communication network; an Internet for allowing the mobile communication terminal to access a web page provided by the application-providing server through the mobile communication network; a subscriber database for storing a MIN and subscriber information of the mobile communication terminal when the mobile communication terminal downloads the application from the application-providing server; an application database for storing various types of application data available by the mobile communication terminal; and a computer for accessing the web page provided by the application-providing server by using the Internet, and selecting the application necessary for the mobile communication terminal.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Figure 1:
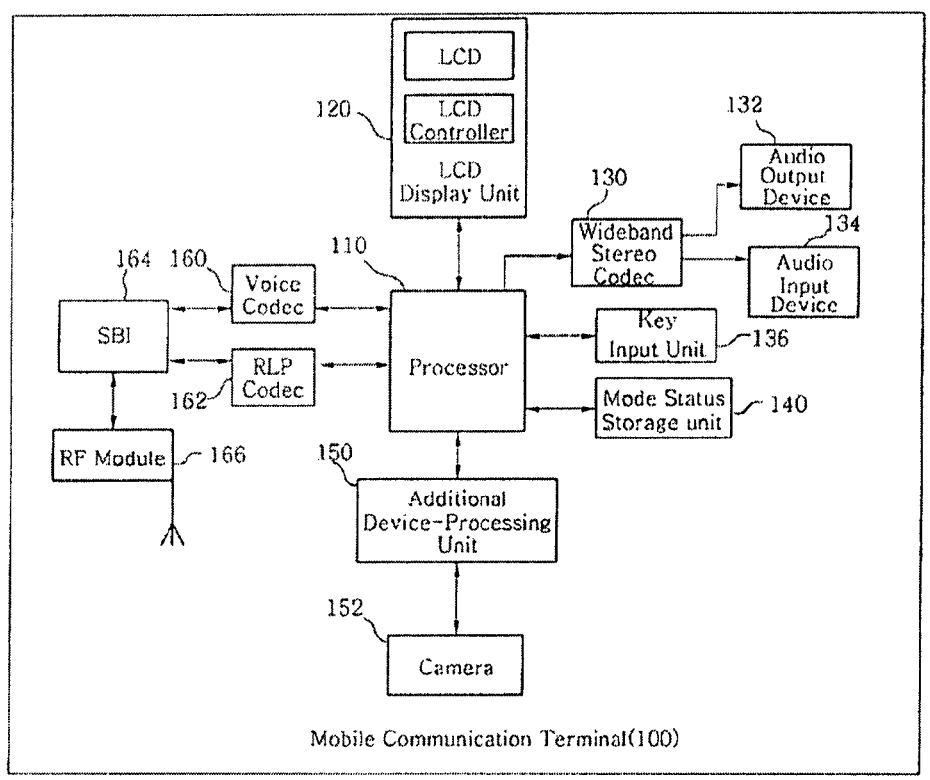
FIG. 1 is a block diagram schematically illustrating the construction of a system for storing the status of an application in a mobile communication terminal according to a preferred embodiment of the present invention.

Reference will now be made in detail to the preferred embodiment of the present invention. It should be noted that the similar components are designated by similar reference numerals although they are illustrated in different drawings. Also, in the following description, a detailed description of known functions and configurations incorporated herein will be omitted when it may obscure the subject matter of the present invention.

FIG. 1 is a block diagram schematically illustrating the construction of a system of a mobile communication terminal for storing the status of an application according to a preferred embodiment of the present invention.

The mobile communication terminal in the present specification includes a Personal Digital Assistant (PDA), a cellular phone, a Personal Communication Service (PCS) phone, a Global System for Mobile (GSM) phone, a Wideband CDMA (WCDMA) phone, a CDMA-2000 phone, a Mobile Broadband System (MBS) phone, etc. The MBS phone refers to a mobile phone to be used in a 4G system being currently discussed.

The mobile communication terminal 100 for storing the status of an application according to the present invention includes a processor 110, a Liquid Crystal Display (LCD) display unit 120, a wideband stereo codec 130, an audio output device 132, an audio input device 134, a key input unit 136, a mode status storage unit 140, an additional device-processing unit 150, a camera 152, a voice codec 160, a Radio Link Protocol (RLP) codec 162, a Serial Bus Interface (SBI) 164 and an RF module 166.

The processor 110 controls the general functions of the mobile communication terminal 100, generally uses an ARM 7 or an ARM 9 in the mobile communication terminal 100, and has a platform Application Programming Interface (API) for encoding the stage and parameter of an application to generate a single string value when executing the application through a wireless communication network of the mobile communication terminal 100, and generating available string values corresponding to the statuses of multiple applications.

Since a method for encoding the stage of an application into a single string value necessary for the present invention can be sufficiently embodied by those skilled in the art, details will be omitted.

The LCD display unit 120 includes an LCD controller and an LCD. The LCD controller reads graphic data from a frame buffer and transmits the graphic data to the LCD screen of the mobile communication terminal 100 according to a predetermined format, and the LCD displays the graphic data received from the LCD controller.

The wideband stereo codec 130 converts audio data into analog signals and outputs the analog signals to the audio output device 132.

The audio output device 132 outputs audio data and corresponds to a speaker with an amplifier.

The audio input device 134 is a microphone within the mobile communication terminal 100.

The key input unit 136 is an input device including both numeral keys used for inputting phone numbers and a function key used for calling a specific function when the mobile communication terminal 100 is used.

The mode status storage unit 140 stores a bell mode, a vibration mode, etc. When an application is executed using the mobile communication terminal 100, the mode status storage unit 140 receives string values expressing the parameter and current status of the application from the processor 110, and stores the received string values. When the key input unit 136 calls a string value of a specific application through the processor 110, the mode status storage unit 140 searches for the stored string values and transmits a desired string value to the processor 110.

The additional device-processing unit 150 performs a data input/output-processing function of devices (cameras, camcorders, etc.) installed or additionally mountable in the mobile communication terminal 100.

The voice codec 160 is a vocoder, which compresses voice data inputted through the processor 110, sends the compressed voice data to the SBI 164, restores voice data inputted through the SBI 164, and sends the restored voice data to the processor 110.

The RLP codec 162 converts image data stored through the camera 152 according to the format determined in a wireless data network before transmitting the image data to the RF module 166, and restores the converted image data.

The SBI 164 converts parallel data inputted through the voice codec 160 into serial data, and transmits the serial data to the RF module 166.

The RF module 166 converts the serial data inputted through the SBI 164 into RF signals, and transmits the RF signals to a radio base station 212.

Figure 2:
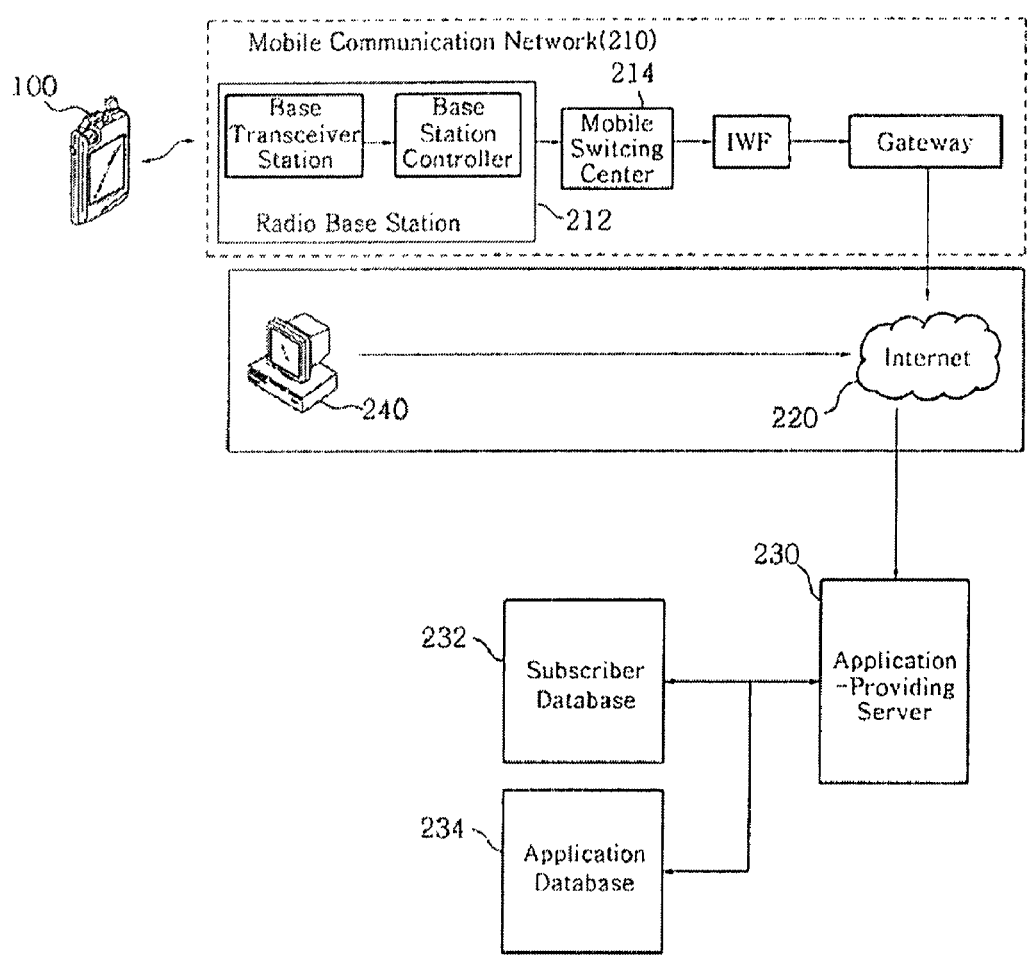
FIG. 2 is a block diagram schematically illustrating a system for storing the status of a wireless network application by using a mobile communication terminal according to a preferred embodiment of the present invention.

FIG. 2 is a block diagram schematically illustrating a system for storing the status of a wireless network application by using the mobile communication terminal according to the preferred embodiment of the present invention.

The system for transmitting data to the mobile communication terminal through a wireless network according to the present invention includes the mobile communication terminal 100, a mobile communication network 210, the Internet 220, an application-providing server 230, a subscriber database 232, an application database 234 and a computer 240.

The mobile communication terminal 100 accesses a web page provided by the application-providing server 230 via the Internet 220 by using an Internet access browser such as a Wireless Application Protocol (WAP) corresponding to a wireless Internet access protocol, Microsoft Internet Explorer (MIE) based on a HyperText Markup Language (HTML) using an HTTP protocol, a Handheld Device Transport Protocol (HDTP), i-Mode in NTT DOKOMO, and 'NATE' in SK Telecom. Then, the mobile communication terminal 100 selects and downloads an application desired by a user. Among the Internet access protocols used in the mobile communication terminal 100, the MIE uses m-HTML obtained by slightly modifying and abbreviating the HTML, and the i-Mode uses compact HTML (c-HTML) corresponding to the subset of the HTML.

The mobile communication network 210 includes the radio base station 212 and a mobile switching center 214, and relays voice and data signals of the mobile communication terminal 100 between the mobile communication terminal 100 and the Internet 220.

The radio base station 212 transmits the location information, register information and data communication request signals of the mobile communication terminal 100 to the mobile switching center 214, includes a base transceiver station, a base station controller, an enhancer (not shown), etc., and supports both synchronous and asynchronous services.

The base transceiver station can obtain information about the latitude, the longitude, etc., of a place in which the base transceiver station is located from a Global Positioning System (GPS, not shown), and transfers the obtained location information to the mobile communication terminal 100 through a system parameter message of a forward link call channel. The mobile communication terminal 100 computes its own movement distance by using the location information of the base transceiver station of a cell including the mobile communication terminal 100, thereby registering new location information.

The location registration is a processing procedure for reporting the location, state, identifier, slot period and additional features of the mobile communication terminal 100 to the mobile switching center 214 through the base transceiver station, and a procedure for causing the mobile communication terminal 100 to be effectively called when the base transceiver station sets an incoming call to the mobile communication terminal 100. Such location registration of the mobile communication terminal 100 is performed when the mobile communication terminal 100 is powered on or off, when the mobile communication terminal 100 moves between the mobile switching centers 214, and when the parameter of the mobile communication terminal 100 is altered.

The base station controller controls the base transceiver station, and performs radio channel allocation and release for the mobile communication terminal 100, transmit power control of the mobile communication terminal 100 and the base transceiver station, determination of inter-cell soft handoff and hard handoff, transcoding and vocoding, a GPS clock distribution, operation and maintenance for a base station, etc. Further, the base station controller transmits subscriber information of the mobile communication terminal 100 having performed the location registration to the mobile switching center 214. Furthermore, the base station controller transfers data communication request signals to the mobile switching center 214, the data communication request signals being received from the mobile communication terminal 100 through the base transceiver station.

The mobile switching center 214 processes basic and supplementary services, incoming and originating calls of a subscriber, a location registration procedure and a handoff procedure, and performs an interworking function with another network, etc. The mobile switching center 214 of an IS-95 A/B/C system includes subsystems such as an Access Switching Subsystem (ASS) for performing a distributed call processing function, an Interconnection Network Subsystem (INS) for performing a centralized call processing function, a Central Control Subsystem (CCS) for taking charge of a centralization function of operation and preservation, a Location Registration Subsystem (LRS) for performing storage and maintenance functions of information for mobile subscribers, etc.

Further, if the location registration of the mobile communication terminal 100 is performed through the radio base station 212, the mobile switching center 214 temporarily stores the subscriber information of the mobile communication terminal 100 in a visitor location register, and transmits a location registration request of the mobile communication terminal 100 to a home location register.

The mobile switching center 214 for 3G and 4G may include an Asynchronous Transfer Mode (ATM) switch (not shown) for increasing the efficiency of transmission speed and line use through cell-by-cell packet transmission.

The computer 240 accesses the Internet 220 through a modem or a LAN, searches for and selects an application desired by a user of the mobile communication terminal 100 from a web page provided by the application-providing server 230, and sends application download signals to the mobile communication terminal 100 so that the mobile communication terminal 100 can download the selected application. In order to access the Internet 220 through the computer 240, a web browser is used, which includes Mosaic invented by NCSA, Navigator in Netscape, Internet explorer in Microsoft, Hot Java in SunMicrosystem, Opera in Operasoft, Lynx for a Unix system, etc.

The Internet 220 is a communication network for providing an access path so that the mobile communication terminal 100 can access the application-providing server 230 via the mobile switching center 214 and can transmit/receive data in wireless Internet access. In wired Internet access through the computer 240, the Internet 220 provides an access path so that data transmission can be easily accomplished through a web browser.

The user of the mobile communication terminal 100 can access the application-providing server 230 through the system as described above, and search for, select and download an application necessary for the mobile communication terminal 100.

If the user of the mobile communication terminal 100 accesses the application-providing server 230, the application-providing server 230 provides data stored in the application database 234 registered in a website to the mobile communication terminal 100 or the computer 240 of a subscriber.

When the user of the mobile communication terminal 100 accesses the application-providing server 230 through the wired Internet using the computer 240 and downloads an application, the user must separately input the MIN of the mobile communication terminal 100. However, if the user accesses the application-providing server 230 through the wireless Internet by using the mobile communication terminal 100, data stored in the application-providing server 230 are stored together with the MIN of the mobile communication terminal 100, even without separately inputting the MIN.

The subscriber database 232 stores basic personal information of a subscriber using the mobile communication terminal 100, a MIN, and information (data name, data path, data size, etc.) of data inputted by a subscriber.

The subscriber database 232 and the application database 234 can be embodied according to the object of the present invention by using a Relational Database Management System (RDBMS) such as Oracle, Informix, Sybase and DB2, an Object-Oriented Database Management System (OODBMS) such as Gemston, Orion and O2, or an XML native database such as Excelon, Tamino and Sekaiju, and has proper fields or elements for achieving its own functions.

Since the creation and management of a database necessary for the present invention can be sufficiently embodied by those skilled in the art, details will be omitted.

First, the application-providing server 230 must provide an application to the user of the mobile communication terminal 100 through the wireless Internet or the wired Internet. That is, the application-providing server 230 manages a wired access website and a wireless access website created using a web language such as HTML and Wireless Markup Language (WML) for allowing the user of the mobile communication terminal 100 to search for and download a desired application.

The user of the mobile communication terminal 100 can access the application-providing server 230 by using the wireless Internet of the mobile communication terminal 100 or the wired Internet using the computer 240, and search for, select and download applications stored in the application database 234 connected to the application-providing server 230.

The application database 234 stores applications necessary for mobile communication terminals by using supplier Identifiers (IDs) assigned to mobile communication companies from providers for supplying the applications necessary for mobile communication terminals. The application-providing server 230 provides a web page for allowing mobile communication terminal users to search for and download the applications stored in the application database 234.

Figure 3:
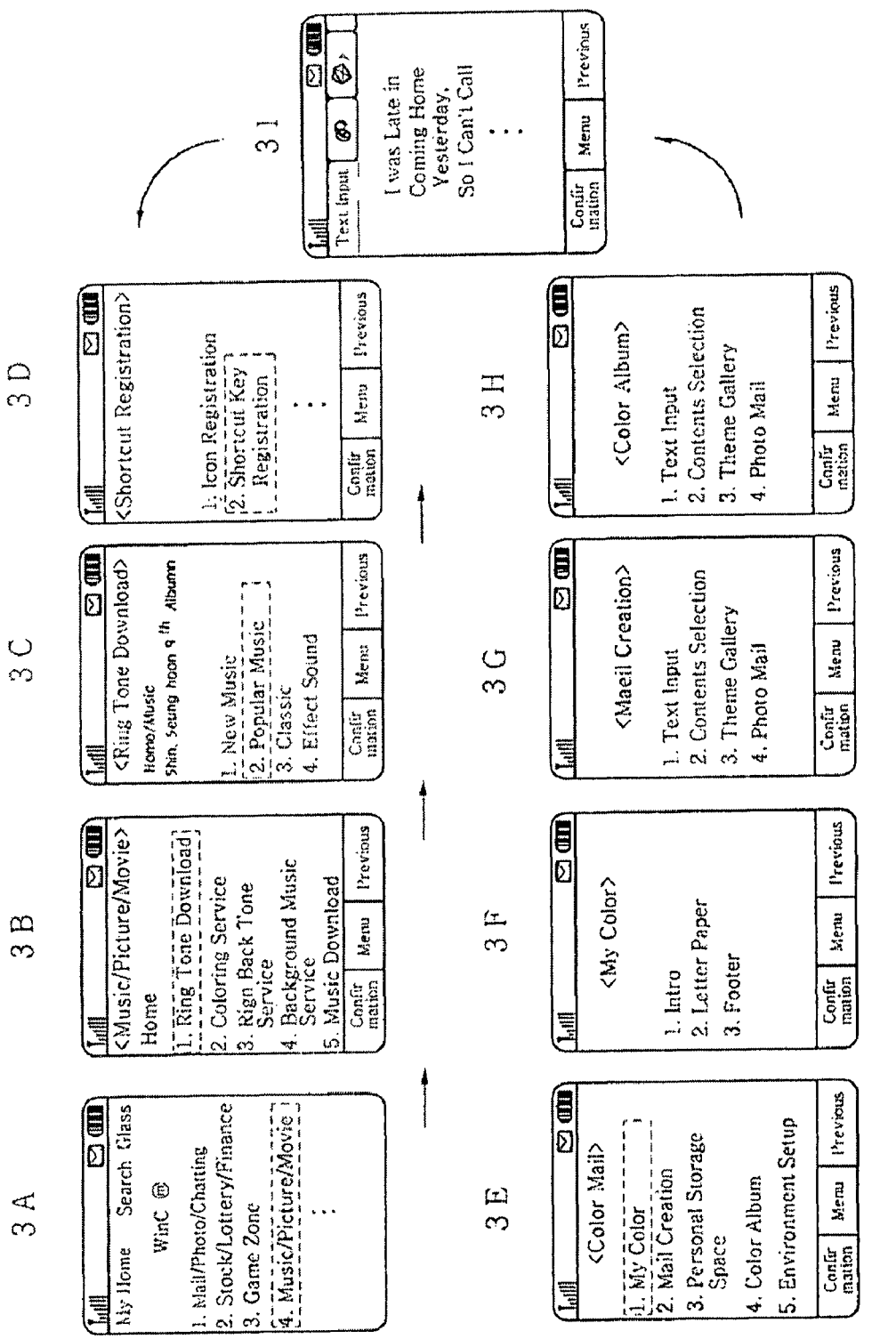
FIG. 3 is a diagram illustrating a process for storing the status of an application by using a mobile communication terminal according to a preferred embodiment of the present invention.

FIG. 3 is a diagram illustrating a process for storing the status of an application by using the mobile communication terminal according to the preferred embodiment of the present invention.

A user accesses the wireless Internet through an Internet access menu, e.g. NATE in SK Telecom, by using the mobile communication terminal 100. If a menu is displayed as illustrated in FIG. 3a, the user can select an application of contents desired by the user in a top-down manner. FIG. 3b is a screen displaying "4. music/picture/movie" selected in FIG. 3a. While the screen of FIG. 3b is displayed, three buttons including a confirmation button, a menu button and a previous button are generated in the bottom portion of the screen. If the user selects the desired contents and presses the confirmation button in the screen of FIG. 3b, a service list screen relating to ring tone downloading is displayed in the mobile communication terminal 100 as illustrated in FIG. 3c. Then, when the user uses a wireless application through the mobile communication terminal 100, the user can select a menu and register the status of the wireless application in a shortcut in the screen of FIG. 3d in order to use a ring tone downloading service without passing through the screens of FIGS. 3a and 3b. If the status of the wireless application is stored in the shortcut in the screen of FIG. 3d, the screen of FIG. 3c can be directly displayed without passing through the screens of FIGS. 3a and 3b when the user executes the stored application in the future.

The screen of FIG. 3e is a screen in which the user of the mobile communication terminal 100 uses the color mail menu of the mobile communication terminal 100 in order to use color mail. In the color mail menu, the user can perform various setups according to the preference of the user as illustrated in FIGS. 3f to 3h, select one of the various setups according to the preference of the user, inputs texts in the screen of FIG. 3l having the setup value selected by the user, and transmits color mail. The user selects the menu in the bottom portion of the screen of FIG. 3l to activate the shortcut screen of FIG. 3d, thereby storing the setup status of the color mail. Further, the user stores various patterns in the shortcut, respectively, and thus can directly display the screen of FIG. 3l if the situation requires.

Figure 4:
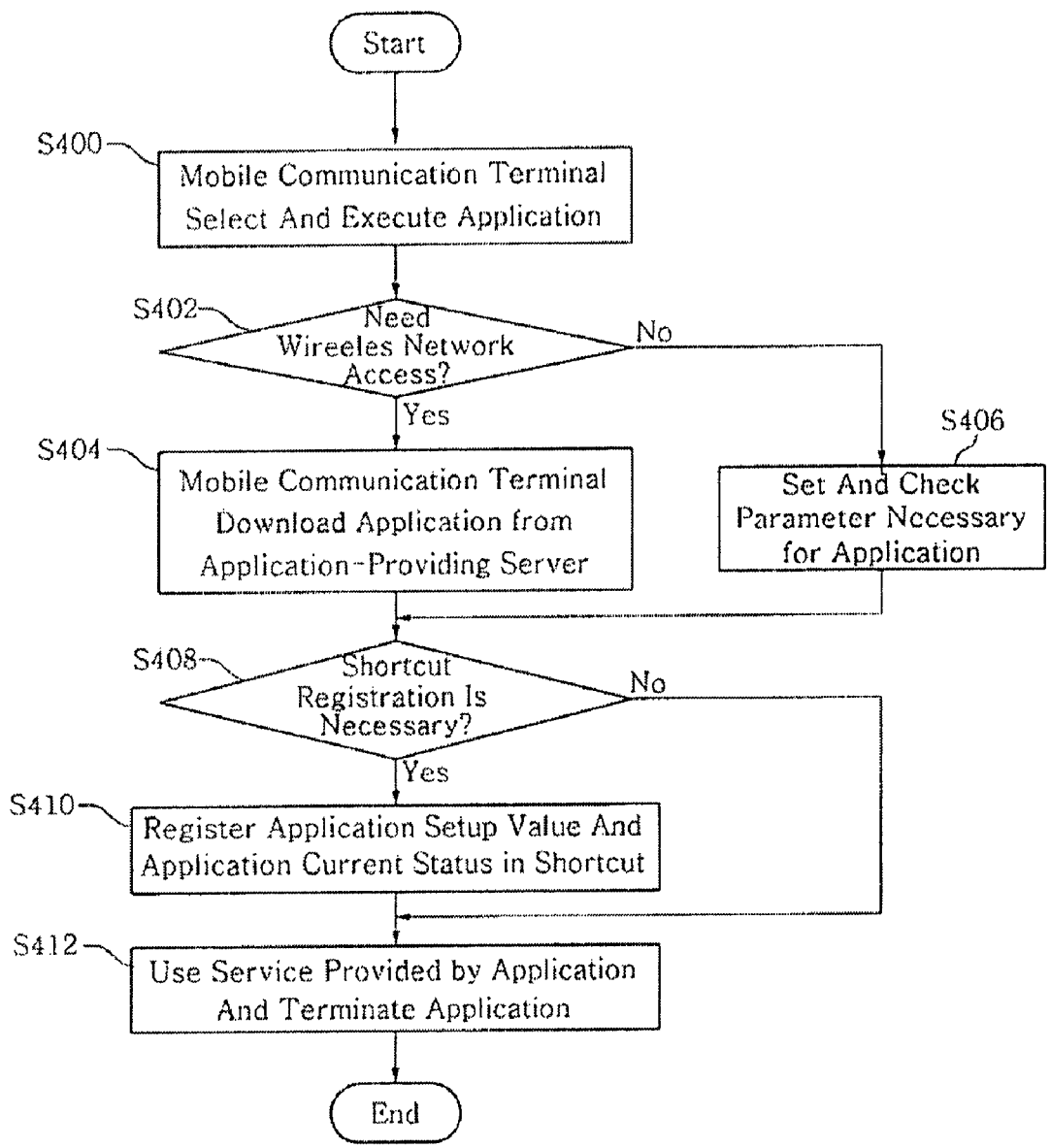
FIG. 4 is a diagram illustrating a process for storing and using the status of an application by using a mobile communication terminal according to a preferred embodiment of the present invention.

FIG. 4 is a diagram illustrating a process for storing and executing the status of an application by using the mobile communication terminal according to the preferred embodiment of the present invention.

The user of the mobile communication terminal 100 can select a message application by using the mobile communication terminal 100 in order to send texts, can download ring tone, music, background scenes, etc., in the mobile communication terminal 100, or can select a wireless network application in order to choose menus displaying weather, shopping, news, chatting, etc (S400).

If the user of the mobile communication terminal 100 selects a predetermined application, the mobile communication terminal 100 determines if the selected application needs wireless network access (S402).

If the selected application needs the wireless network access, the mobile communication terminal 100 accesses the application-providing server 230 provided by a mobile communication company through the mobile communication network 210, searches for the application desired by the user from the application database 234, and transmits the found application to the mobile communication terminal 100 (S404).

However, if the selected application does not need the wireless network access, the user executes the application, and then sets and checks parameters necessary for the selected application (S406).

If a download help page of the corresponding application is completely transmitted from the application-providing server 230, the user checks the status of the application-providing server 230 and determines that a shortcut registration is necessary (S408).

If it is determined that it is necessary to register the setup value of the application or the current status of the application-providing server 230 in the shortcut, the user selectively registers the parameter of the application or the current status of the application-providing server 230 in shortcut key and icon of the mobile communication terminal 100 by using the menus in the screen the mobile communication terminal 100 (S410). Registering or storing information in a shortcut refers to storing the information in a storage unit accessible through operating the shortcut key and/or icon.

If the shortcut registration is completed, the user uses a service provided by the application, and then terminates the application (S412).

After the setup value of the application or the current status of the application-providing server 230 is registered in the shortcut, it is possible to directly load the screen storing the parameter of the corresponding application in the future, to load the current status of the application-providing server 230 without passing through the previous step so that the application desired by the user can be selected, and to register multiple parameters in the shortcut, respectively.

While this invention has been described in connection with what is presently considered to be the most practical and preferred embodiment, it is to be understood that the present invention is not limited to the disclosed embodiment and the drawings, but, on the contrary, it is intended to cover various modifications and variations within the spirit and scope of the appended claims.

INDUSTRIAL APPLICABILITY

According to the present invention as described above, the setup value of an application or the current status of an application-providing server is registered in a shortcut, so that it is possible to directly load an application frequently used by a mobile communication terminal user without passing through the previous step. Consequently, it is possible to improve the degree of utilization of a mobile communication terminal application.

The invention claimed is:

1. A method of storing status of an application by a mobile communication terminal, the application being executed on the mobile communication terminal, the method comprising:
   determining whether a user of the mobile communication terminal made a selection to store the status of the application under execution;
   in response to the selection to store the status of the application, generating and storing a single string value associated with the application, the single string value including an application parameter and application status information of the application being executed at the time of the storage of the single string value;
   reading the single string value associated with the application in response to a user command to execute the application; and
   resuming execution of the application directly to the status at the time of the storage of the single string value according to the application parameter and the application status information of the application read from the single string value;
   wherein the application has a hierarchical menu structure, the application status information includes information regarding a menu level corresponding to a user menu that the application displays at the time of the storage of the single string value, and the application information, which is different from the application status parameter, includes a value inputted or set by the user.

2. The method as claimed in claim 1, wherein the generation of the single string value is accomplished within the application, and the storage and selection of the single string value are accomplished in a platform level.

3. A system for storing a status of an application being executed on a mobile communication terminal, the system comprising:
   a mobile communication terminal for executing the application, setting an application parameter, and storing application status information;
   a mobile communication network for allowing the mobile communication terminal to download the application through a wireless network;
   an application-providing server for providing a search of the application to the mobile communication terminal through the mobile communication network;
   an Internet for allowing the mobile communication terminal to access a web page provided by the application-providing server through the mobile communication network;
   wherein the mobile communication terminal includes a processor configured to determine whether a user of the mobile communication terminal selects to store the status of the application, to generate a single string value comprising an application parameter and application status information, to store the single string value in a memory in response to the selection to store the status of the application, to read the single string value associated with the application in response to a user command to select and execute the application, and to resume execution of the application directly to the status of the application at the time of the saving of the single string value according to the application parameter and the application status information read from the single string value,
   wherein the application has a hierarchical menu structure, the application status information includes information regarding a menu level corresponding to a user menu in a hierarchical menu structure that the application displays at the time of the storage of the single string value, and the application parameter, which is different from the application status information, includes a value inputted or set by the user.

4. The system as claimed in claim 3, wherein the application status information and the application parameter are associated with a shortcut key or a shortcut icon on the mobile communication terminal.

* * * * *